(12) United States Patent
Gandrud

(10) Patent No.: US 6,925,892 B2
(45) Date of Patent: *Aug. 9, 2005

(54) METHOD AND MEANS FOR MONITORING TORQUE IN A HYDRAULIC POWER UNIT

(75) Inventor: Michael D Gandrud, Ames, IA (US)

(73) Assignee: Sauer-Danfoss, Inc., Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/738,773

(22) Filed: Dec. 17, 2003

(65) Prior Publication Data

US 2005/0132817 A1 Jun. 23, 2005

(51) Int. Cl.[7] .............................. G01L 3/10; G01L 3/02; G01L 3/12; G01L 3/14
(52) U.S. Cl. .................................................. 73/862.331
(58) Field of Search ..................... 73/862, 23, 862.333, 73/862.33, 862.331, 22, 862.334; 474/18; 477/40

(56) References Cited

U.S. PATENT DOCUMENTS

| | | |
|---|---|---|
| 3,932,112 A | 1/1976 | Garshelis |
| 3,939,448 A | 2/1976 | Garshelis |
| 3,959,751 A | 5/1976 | Garshelis |
| 3,961,297 A | 6/1976 | Garshelis |
| 4,152,930 A | 5/1979 | Fujimoto et al. |
| 4,631,043 A * | 12/1986 | Tokoro et al. ................. 474/18 |
| 4,673,378 A * | 6/1987 | Tokoro et al. ................. 474/18 |
| 4,760,745 A | 8/1988 | Garshelis |
| 4,874,053 A | 10/1989 | Kimura et al. |
| 4,882,936 A | 11/1989 | Garshelis |
| 4,896,544 A | 1/1990 | Garshelis |
| 4,950,988 A | 8/1990 | Garshelis |
| 4,953,411 A | 9/1990 | Coenen et al. |
| 5,052,232 A | 10/1991 | Garshelis |
| 5,157,992 A * | 10/1992 | Hayashi et al. ................ 477/40 |
| 5,167,148 A | 12/1992 | Black et al. |
| 5,195,377 A | 3/1993 | Garshelis |
| 5,351,555 A | 10/1994 | Garshelis |
| 5,367,257 A | 11/1994 | Garshelis |
| 5,465,627 A | 11/1995 | Garshelis |
| 5,520,059 A | 5/1996 | Garshelis |
| 5,591,925 A | 1/1997 | Garshelis |
| 5,706,572 A | 1/1998 | Garshelis |
| 5,708,216 A | 1/1998 | Garshelis |
| 6,047,605 A | 4/2000 | Garshelis |
| 6,145,387 A | 11/2000 | Garshelis |
| 6,330,833 B1 | 12/2001 | Opie et al. |
| 6,414,482 B1 | 7/2002 | Mase |
| 6,520,274 B1 | 2/2003 | McElmeel, Jr. et al. |
| 6,601,462 B1 | 8/2003 | Ueno et al. |
| 6,817,253 B2 * | 11/2004 | Gandrud .................. 73/862.23 |

OTHER PUBLICATIONS

"The New Standard for Torque Sensing", Magnetoelastic Devices Inc.—Copyright 1998.

* cited by examiner

Primary Examiner—Max Noori
Assistant Examiner—Octavia Davis

(57) ABSTRACT

The present invention is directed towards a hydraulic power unit including a housing, an internal hydraulic power means, an external hydraulic power means, and a mechanical power shaft associated with the hydraulic power means. In addition, the hydraulic power unit comprises a transducer adapted for measuring torque mounted in the housing in a non-contact relation to the mechanical power shaft adjacent a portion of the shaft imposed with a magnetic field. The hydraulic power unit further comprises a controller associated with the transducer to monitor the measured torque and adjust the operation of the hydraulic power unit accordingly.

5 Claims, 1 Drawing Sheet

METHOD AND MEANS FOR MONITORING TORQUE IN A HYDRAULIC POWER UNIT

BACKGROUND OF THE INVENTION

The present invention relates to a torque transducer and, more specifically, to applications of a torque transducer and associated controller coupled to a hydraulic power unit.

Measuring the torsional forces acting on a shaft, particularly a power shaft, is often desirable. Hydraulic power units such as pumps, motors, transmissions, valves, and steering units are used to convert and transmit power between devices in many types of equipment. For example, a hydraulic pump may convert the power of an internal combustion engine or other source into a flow of high pressure hydraulic oil that can be used for performing a useful function in a machine. This flow of high pressure oil may be used to power a hydraulic motor that propels a wheel or track in a vehicle such as a tractor, bulldozer, or crane. In other instances, this flow of high pressure oil may be used to operate hydraulic cylinders that perform such functions as manipulating the excavation bucket on a back hoe or for another device.

The primary measurements that are useful for determining performance and controlling hydraulic power units are the fluid pressure, fluid flow, shaft rotation speed, and shaft torque. Pressure, flow, and speed are routinely measured with readily available sensors. In the past, pressure and flow sensors have been integrated into hydraulic power units such as hydrostatic pumps and motors. Examples of using speed sensors are given in U.S. Pat. No. 5,325,055.

Several technologies are available for measuring the torque experienced by a rotating shaft. Many of these common technologies, often called "contact" torque transducers, utilize strain gauges, sensors, or radio transmitters that are attached to the rotating shaft. Further, many of these technologies have integrated contact type torque transducers into a hydraulic power unit.

Non-contact torque transducers also have been developed in the prior art. An example of such a device is shown in U.S. Pat. No. 5,052,232. In this system, the rotating shaft is circularly magnetized in such a manner that a measurable axial magnetic field is created outside of the shaft which is indicative of the torque experienced by the shaft. The prior art has also demonstrated the integration of a magnetoelastic torque transducer into a hydraulic power unit. An example of the integration of a magnetoelastic torque transducer into a hydraulic power unit is shown in U.S. Pat. No. 2003/0172747 to Gandrud.

While these torque transducers have been integrated into hydraulic power units, the prior art has not developed applications for use with torque transducers in association with hydraulic power units. Further, the prior art has not integrated a controller with a hydraulic power unit equipped with a torque transducer.

It is therefore a principal object of this invention to provide a system and method for monitoring the torque imposed on a shaft of a hydraulic power unit.

A further object of this invention is to provide a hydraulic power unit with a torque transducer and a controller associated with the transducer to monitor the measured torque.

Yet a further object of the present invention is the application of an integrated torque sensing technology that can be produced at a cost which will enable its use on a volume production basis.

Still a further object of the present invention is the application of a torque sensing technology that is sufficiently compact to provide for installation within hydraulic power units.

These and other objects will be apparent to those skilled in the art.

BRIEF SUMMARY OF THE INVENTION

The present invention is directed towards a hydraulic power unit including a housing, a hydraulic power means, an input power means, and an output power means associated with the hydraulic power means. At least one power means of the hydraulic power unit is a power shaft or a control shaft. In addition, the hydraulic power unit comprises a transducer adapted for measuring torque mounted in the housing in a non-contact relation to a power shaft adjacent a portion of the shaft imposed with a magnetic field. The hydraulic power unit further comprises a controller associated with the transducer to monitor the measured torque and adjust the operation of the hydraulic power unit accordingly.

DESCRIPTION OF THE PREFERRED EMBODIMENTS OF THE INVENTION

Figure 1:
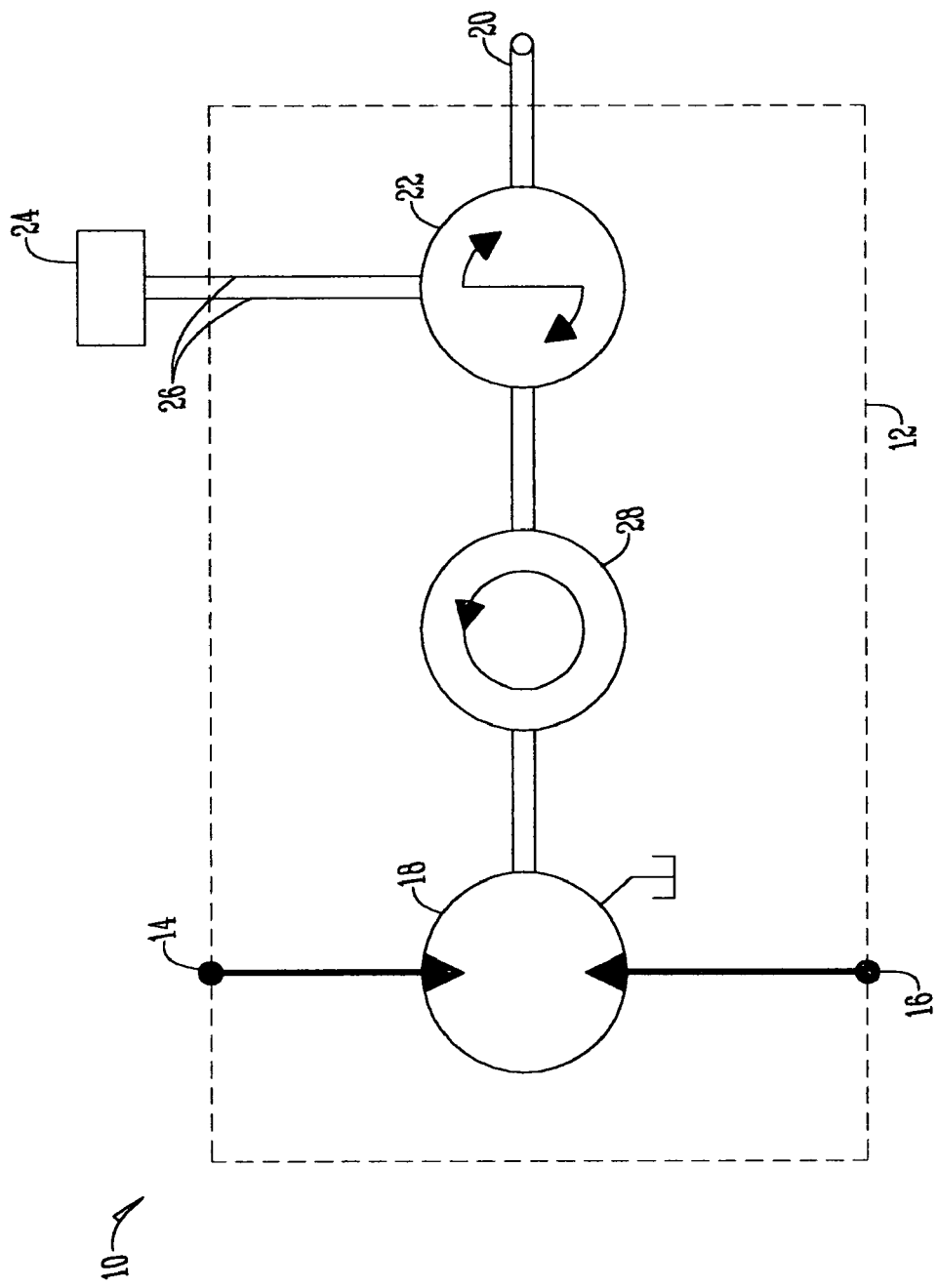
FIG. 1 is an instrument diagram of the present invention.

With respect to FIG. 1, a hydraulic power unit 10 is shown with a housing 12, a first hydraulic power means 14, a second hydraulic power means 16, a hydraulic unit 18, and a mechanical power shaft 20. As shown in FIG. 1, hydraulic unit 18 is a hydraulic pump. Alternatively, hydraulic unit 18 may be a hydraulic motor.

A torque transducer 22 is shown integrated within housing 12. Alternatively, torque transducer 22 may be located externally of housing 12. Torque transducer 22 is associated with the mechanical power shaft 20 and measures or senses the torque acting on the mechanical shaft 20. Torque transducer 22 is a non-contact magnetoelastic transducer. Alternatively, torque transducer 22 may be a contact transducer, such as a strain gauge, sensor, or radio transmitter attached to output shaft 20. Additionally, torque transducer 22 may include other types of non-contact torque transducers such as those that use rotary transformers, induction, telemetry, or other non-contact sensing methods.

Controller 24 is located externally of housing 12. Alternatively, controller 24 may be integrated within housing 12. Controller 24 is associated with the transducer 22 via lead lines 26. Torque transducer 22 is associated with speed transducer 28, which monitors the rotational speed of shaft 20. Controller 24 monitors and analyzes the torque acting on mechanical shaft 20 measured by torque transducer 22. Depending upon the specific application, controller 24 monitors the torque acting on mechanical shaft 20 and then controls the operation of the hydraulic power unit 10 accordingly. For instance, controller 24 can be used to control and limit the horsepower that a hydraulic power unit requires from a power source such as an internal combustion engine, or delivers to a load such as a wheel. In addition, controller 24 can be used to control and limit the hydraulic transmission or pump performance in such a manner that prevents excess torque or stalling of a power source such as an internal combustion engine. Further, controller 24 can be used to control and limit the torque which is applied by a hydraulic motor or transmission to its load in order to prevent damage to the load or to obtain better control of the load.

In operation, hydraulic power unit 10 may operate as a hydraulic motor where mechanical power shaft 20 rotates to power an external load, or may operate as a hydraulic pump where mechanical power shaft 20 is rotated by another power source such as an internal combustion engine (not shown). Torque transducer 22 measures or senses the torque acting on mechanical shaft 20 during operation. Controller 24 monitors the torque levels measured by torque transducer 22 and controls and adjusts the performance of the hydraulic power unit 10 depending upon the specific application.

One application for the hydraulic power unit 10 is for use with axial piston open circuit pumps driven by engine accessory gear drives. Gear drives typically have a limited torque rating. As such, if a hydraulic pump is driven by the accessory gear drive, the pump must be controlled in such a manner that the pump flow and pressure do not require excessive torque from the engine. An axial piston open circuit pump may be used to control several vehicle functions, such as providing hydraulic fluid to a steering system as well as to an engine cooling fan. If an operator should place excessive demands on the steering system by making abrupt turns at the same time that the engine fan is turning at maximum speed, then the hydraulic pump may demand damaging torque levels from the engine. By equipping the hydraulic power unit with a torque transducer associated with the system controller, this damaging torque level could be abated.

Another application for the hydraulic power unit 10 is for use with cranes and excavating machines. Cranes and excavating machines have special control and "operator feel" requirements. These machines are very large in size and oftentimes difficult to control. At the same time, operators require the machines to make precise movements. As such, the use of a torque transducer in association with a hydraulic power unit provides improved information to the controller, allowing for better control of the hydraulic power unit.

Still another application for the hydraulic power unit 10 is for use with winches, particularly those used in marine or highway applications. Some winch applications require that a winch maintain a constant cable tension. In other applications where a winch is used to lift a load from the deck of a moving ship, it is desirable to have precise control of the torque level as the winch tightens the cable. Because the ship is subject to the vertical rise and fall of ocean waves, the winch may have to reel in or out cable to compensate. In crane applications, winches normally incorporate a braking system. When a load is raised or lowered, the brake is disengaged and cable is reeled in or out. The brake is applied when the load is suspended or the crane is otherwise stationary. At the instant that the brake is disengaged, it is important that the hydraulic power unit apply the precise torque required by the load. If the torque level is not correct, the load may rise or fall uncontrollably. In the prior art, power unit pressure was measured and a theoretical calculation was used for estimating power unit torque. This calculation requires that displacement of the hydraulic power unit be known or readily measurable and that the power unit torque efficiency be accurately estimated. As it is difficult to accurately estimate the torque efficiency of a hydraulic power unit, the prior art methods of control may not always be optimal. By using a torque transducer in association with a hydraulic power unit, the controller can monitor and quickly react to the situations, thereby adjusting torque levels for improved operation by reducing undesired movements of loads.

Another application for the hydraulic power unit 10 is for use with concrete or asphalt paving machinery. When concrete or asphalt paving machinery are being used, a construction crew typically has a string of trucks looping between the construction site and a supply yard to continuously feed concrete or asphalt paving materials to the paving machine. If a paving machine fails unexpectedly, the paving materials must be disposed of before they are rendered useless in the truck. The waste of such quantities of paving material combined with the disposal costs may be considerable. Associating a torque transducer and controller with the hydraulic power unit driving the paving machinery is useful for predicting the failure of the system. Through early detection of such an impending failure, an operator could notify the construction crew to stop sending trucks with paving materials and rather send a repair technician.

Yet another application for the hydraulic power unit 10 is for use with drilling machines, such as those used to drill water, oil, or natural gas wells. Drill rigs are used for drilling water wells, oil wells, and natural gas wells, as well as drilling blast holes for mines. Horizontal drilling machines are used for installing cables and other utilities without disturbing above ground improvements. By using a torque transducer and controller in conjunction with the hydraulic power unit that drives these machines, improved performance, monitoring, and control result.

Still another application for the hydraulic power unit 10 is for use with hydraulic pumps that are coupled to an internal combustion engine. In such an arrangement, the hydraulic power unit may require more torque from the internal combustion engine than the engine can safely accommodate. As such, the internal combustion engine may stall or stop, requiring the operator to restart the engine. Use of a torque transducer and controller in association with the hydraulic power unit could prevent such stalling. As the hydraulic power unit nears the torque level that would otherwise stall the internal combustion engine, the controller could limit the pump's demand, thereby limiting the torque that will be placed on the engine and preventing any stalling. In addition to preventing engine stalling, such a system could result in the use of smaller internal combustion engines, as oversized engines would no longer be necessary to accommodate for potential stalling conditions.

A further application for the hydraulic power unit 10 is for use with cement mixing trucks. Such trucks typically have a revolving tank on the back that is used to mix the concrete and prevent it from solidifying while in transit to the construction site. Once at the job site, a specific consistency is desired by the construction crew that pours the concrete. Oftentimes, the concrete that is initially placed in the tank at the supply yard is more viscous than when it is poured. Construction crews will add water to the mix at the job site until the desired consistency is achieved. Hydraulic power units are used to turn the concrete mixing tank on most cement trucks. By using a torque transducer and controller in association with a hydraulic power unit, it is possible to monitor and limit the torque that is required to mix the concrete. Through using such a system, an improved and objectively controllable consistency is achieved. Concrete pouring and smoothing crews desire a very particular consistency for each job in order to facilitate forming, smoothing, and paving. In the present art, this consistency is obtained through the trial and error addition of water to each batch of concrete by persons skilled in the art of concrete. By providing a system for accurately measuring concrete consistency, objective measurements are used to achieve desired concrete consistency without the need for trial and error methods which rely on the experience of skilled concrete professionals.

Another application of the hydraulic power unit is in machines where a swashplate is moved in order to change the displacement of a hydraulic power unit. In such machines, the position of the swashplate and the torque required to hold the swashplate in a desired angle are of importance to the control system of the hydraulic power unit. By measuring the actual torque required by the swashplate of a hydraulic power unit it is possible to adjust the control of the power unit and improve control results.

Still a further application of the hydraulic power unit is as a hydraulic control valve. Hydraulic control valves are used to regulate and control the flow of hydraulic fluid within a hydraulic machine. By measuring torque which is applied to the hydraulic valve by an operator's signal or by another source, it is possible to adjust operation of a hydraulic power unit to more closely respond to the performance that is desired by a machine operator.

It is therefore seen that by the use of a torque transducer and a controller associated with the transducer, this invention permits the monitoring of torque imposed on the power shaft of a hydraulic power unit.

What is claimed is:

1. A hydraulic power unit including a housing, an internal hydraulic power means, an external hydraulic power means and a mechanical power shaft associated with the hydraulic power means, comprising:
   a transducer adapted for measuring torque mounted in the housing in a non-contact relation to an output power shaft adjacent a portion of the output power shaft imposed with a magnetic field, and
   a controller associated with the transducer to monitor the measured torque.

2. A hydraulic power unit including a housing, a hydraulic power means, an input power means and an output power shaft associated with the internal hydraulic power means, comprising:
   a transducer adapted for measuring torque mounted in the housing in a non-contact relation to a mechanical power shaft adjacent a portion of the mechanical power shaft imposed with a magnetic field,
   a controller associated with the transducer to monitor the measured torque, and
   the controller associated with the input power means to modify the magnitude of input power transmitted to the hydraulic power means within predetermined torque parameters.

3. A method for monitoring the torque imposed on a mechanical power shaft of a hydraulic power unit that includes a housing, a hydraulic power means, an input power means and an output power means associated with the hydraulic power means, comprising:
   placing a transducer adapted for measuring torque in the housing in a non-contact relation to the mechanical power shaft adjacent a portion of the mechanical power shaft imposed with a magnetic field, and
   providing a controller associated with the transducer to monitor the measured torque.

4. The method of claim 3 wherein the controller is associated with the input power means to modify the magnitude of input power transmitted to the hydraulic power means within predetermined torque parameters.

5. The method of claim 3 wherein the controller is associated with the power unit functions by adjusting hydraulic power unit displacement for improved performance as indicated by measured torque values.

* * * * *